United States Patent
Leedy

(10) Patent No.: US 9,301,577 B2
(45) Date of Patent: Apr. 5, 2016

(54) SHOE CUSTOMIZATION SYSTEM HAVING INTERCHANGEABLE PLATENS

(71) Applicant: NIKE, INC., Beaverton, OR (US)

(72) Inventor: Gregory R. Leedy, Milwaukie, OR (US)

(73) Assignee: NIKE, Inc., Beaverton, OR (US)

( * ) Notice: Subject to any disclaimer, the term of this patent is extended or adjusted under 35 U.S.C. 154(b) by 101 days.

(21) Appl. No.: 14/200,265

(22) Filed: Mar. 7, 2014

(65) Prior Publication Data

US 2014/0232040 A1 Aug. 21, 2014

Related U.S. Application Data

(62) Division of application No. 12/986,649, filed on Jan. 7, 2011, now Pat. No. 8,701,733.

(51) Int. Cl.
| | |
|---|---|
| *A43D 95/14* | (2006.01) |
| *B41F 17/00* | (2006.01) |
| *B32B 38/14* | (2006.01) |
| *A43B 3/00* | (2006.01) |
| *B29L 31/50* | (2006.01) |

(52) U.S. Cl.
CPC .............. *A43D 95/14* (2013.01); *A43B 3/0084* (2013.01); *B32B 38/14* (2013.01); *B41F 17/006* (2013.01); *B29L 2031/50* (2013.01); *Y10T 156/103* (2015.01); *Y10T 156/1089* (2015.01)

(58) Field of Classification Search
CPC ... B32B 38/14; B29L 31/50; Y10T 156/1089; Y10T 156/103; A43B 3/0084; A43D 95/14; B41F 17/006

USPC .................. 156/277, 580, 581; 425/193, 385; 249/103; 36/45; 12/51, 123.5, 142 R
See application file for complete search history.

(56) References Cited

U.S. PATENT DOCUMENTS

| | | |
|---|---|---|
| 224,030 A | 2/1880 | Mussells et al. |
| 2,291,832 A | 8/1942 | Olson et al. |
| 2,351,660 A | 6/1944 | Campbell |
| 3,632,963 A | 1/1972 | Bosse |
| 3,803,655 A | 4/1974 | White et al. |

(Continued)

FOREIGN PATENT DOCUMENTS

| | | |
|---|---|---|
| GB | 1382912 | 2/1975 |
| WO | 9003744 | 4/1990 |

OTHER PUBLICATIONS

International Search Report and Written Opinion mailed Oct. 5, 2012 in International Application No. PCT/US2012/020145.

(Continued)

*Primary Examiner* — Sonya Mazumdar
(74) *Attorney, Agent, or Firm* — Plumsea Law Group, LLC

(57) ABSTRACT

Heat press platens for a shoe customization/decoration system and a method of using the same are disclosed. The platens may be quickly interchanged to allow the same equipment to be used to dye shoes of different sizes. The platens individually accommodate a pair of assembled shoes and are shaped to: reduce print sizes, maintain symmetry and flatness of the shoe, and accommodate a range of shoe sizes. The size and shape of the platens enable one shoe to be fitted on one side of a platen and another shoe to be fitted on the opposite side. The platens position the shoes so that they are mirror images of each other. This positioning allows a single print, including mirror images of the same design, to be applied to two shoes at the same time.

20 Claims, 12 Drawing Sheets

(56) References Cited

U.S. PATENT DOCUMENTS

| | | |
|---|---|---|
| 3,953,280 A | 4/1976 | Brophy et al. |
| 4,170,511 A | 10/1979 | Milne |
| 4,343,673 A | 8/1982 | Smith et al. |
| 4,398,986 A | 8/1983 | Smith et al. |
| 4,517,443 A | 5/1985 | Dollst |
| 4,731,152 A | 3/1988 | Crowell et al. |
| 4,901,638 A | 2/1990 | Jennings |
| 4,949,416 A | 8/1990 | Price |
| 5,477,577 A | 12/1995 | Hadley |
| 5,494,431 A | 2/1996 | Telfer |
| 6,299,962 B1 | 10/2001 | Davis et al. |
| 6,533,885 B2 | 3/2003 | Davis et al. |
| 7,574,818 B2 | 8/2009 | Meschter |
| 8,206,534 B2 | 6/2012 | McDuff et al. |
| 8,578,534 B2 * | 11/2013 | Langvin ............... A43B 3/0084 12/128 R |
| 8,701,733 B2 | 4/2014 | Leedy |
| 2005/0090928 A1 | 4/2005 | Gibson |
| 2006/0123567 A1 | 6/2006 | Morlacchi |
| 2009/0019648 A1 | 1/2009 | Jones et al. |
| 2009/0286050 A1 | 11/2009 | Langvin et al. |
| 2010/0084083 A1 | 4/2010 | Hull et al. |
| 2010/0139853 A1 | 6/2010 | Park |
| 2010/0326591 A1 | 12/2010 | Langvin et al. |
| 2012/0189852 A1 * | 7/2012 | Lee ..................... A43B 1/0027 428/411.1 |

OTHER PUBLICATIONS

International Preliminary Report on Patentability mailed Jul. 18, 2013 in International Application No. PCT/US2012/020145.

* cited by examiner

SHOE CUSTOMIZATION SYSTEM HAVING INTERCHANGEABLE PLATENS

CROSS-REFERENCE TO RELATED APPLICATION(S)

This application is a divisional application of U.S. Patent Publication Number 2012/0175813, filed Jan. 7, 2011, the entirety of which is hereby incorporated by reference.

BACKGROUND

Embodiments of the present invention relate generally to a shoe customization system and a method of using a shoe customization system.

Multiple systems for varying the size and shape of platens used to print designs on articles of clothing have been proposed. Jennings (U.S. Pat. No. 4,901,638) discloses a method and apparatus for silk screen printing the tops and fronts of completed painter's caps. The apparatus includes: a platen sized and shaped to receive T-shirt fronts; a platen sized and shaped to receive T-shirt sleeves; a platen sized and shaped to receive the tops of painter's caps; and a platen sized and shaped to receive the fronts of painter's caps. While Jennings discloses platens sized and shaped to receive various articles of clothing, these platens are not sized and shaped to receive assembled shoes. Similarly, the platens are not sized and shaped to receive multiple articles of clothing on a single platen. Thus, a drawback to the proposed system of Jennings is that a single platen cannot be used for printing two articles of clothing at the same time. Furthermore, the size of the platens proposed by Jennings cannot be adjusted.

Olsen (U.S. Pat. No. 2,291,832) discloses a method and apparatus for coating a fabric upper of an unassembled shoe with cement. The apparatus includes two rectangular platens hinged together. The platens are used to coat an upper of an unassembled shoe with cement. A drawback to the apparatus proposed by Olsen is that it does not include a platen sized and shaped to receive a pair of shoes. Furthermore, the size of the platens proposed by Olsen cannot be adjusted.

Systems for decorating the bottoms of assembled shoes have been proposed. Mussells (U.S. Pat. No. 224,030) discloses a shank channeling, creasing, and coloring machine. The machine includes four shoe-supports, which hold assembled shoes as they are creased, colored, or stamped. The shoe-supports are attached to the plate by pins and so that they may be readily replaced with shoe-supports having other shapes or sizes. A drawback to the system proposed by Mussells is that the shoe-supports are not sized and shaped to individually receive a pair of assembled shoes. Furthermore, size of the shoe-supports is not adjustable.

SUMMARY

A shoe customization system and a method of using the same are disclosed. In one aspect, the shoe customization system may include a heat press device having a flat press surface, a first curved edge, a second curved edge opposite the first curved edge, and a first connecting edge connecting the first curved edge to the second curved edge. A first shoe receiving portion may be configured to receive a shoe. The first shoe receiving portion may be bounded by part of the first curved edge, part of the second curved edge, and the first connecting edge. A second shoe receiving portion may be configured to receive a shoe. The second shoe receiving portion may be disposed opposite the first shoe receiving portion.

In another aspect, the shoe customization system may include a heat press device having a flat press surface, a first edge, a second edge opposite the first edge, a third edge connecting the first edge to the second edge, and a fourth edge opposite the third edge. The distance between the third edge and the fourth edge may taper from the first edge to the second edge. The heat press device may further include a first shoe receiving portion configured to receive a shoe. The first shoe receiving portion may be bounded by part of the first edge, part of the second edge, and the third edge.

In another aspect, the shoe customization system may include a heat press machine having a first quick connect mechanism and a heat press device configured to be connected to the heat press machine. The heat press device may include a flat press surface, a first edge, a second edge opposite the first edge, and a third edge connecting the first edge to the second edge. The heat press device may further include a first shoe receiving portion configured to receive a shoe. The first shoe receiving portion may be bounded by part of the first edge, part of the second edge, and the third edge. The heat press device may further include a second quick connect mechanism configured to connect to the first quick connect mechanism.

In another aspect, a method of customizing a shoe may include loading a first shoe on a first shoe receiving portion of a heat press device, loading a second shoe on a second shoe receiving portion of the heat press device, connecting the heat press device to a heat press machine, placing a design on top of the first shoe and the second shoe, and pressing a heat plate of the heat press machine on top of the first shoe and the second shoe.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 10 is the press machine from FIG. 7 after the shoes have been printed on.

DETAILED DESCRIPTION

Figure 1:
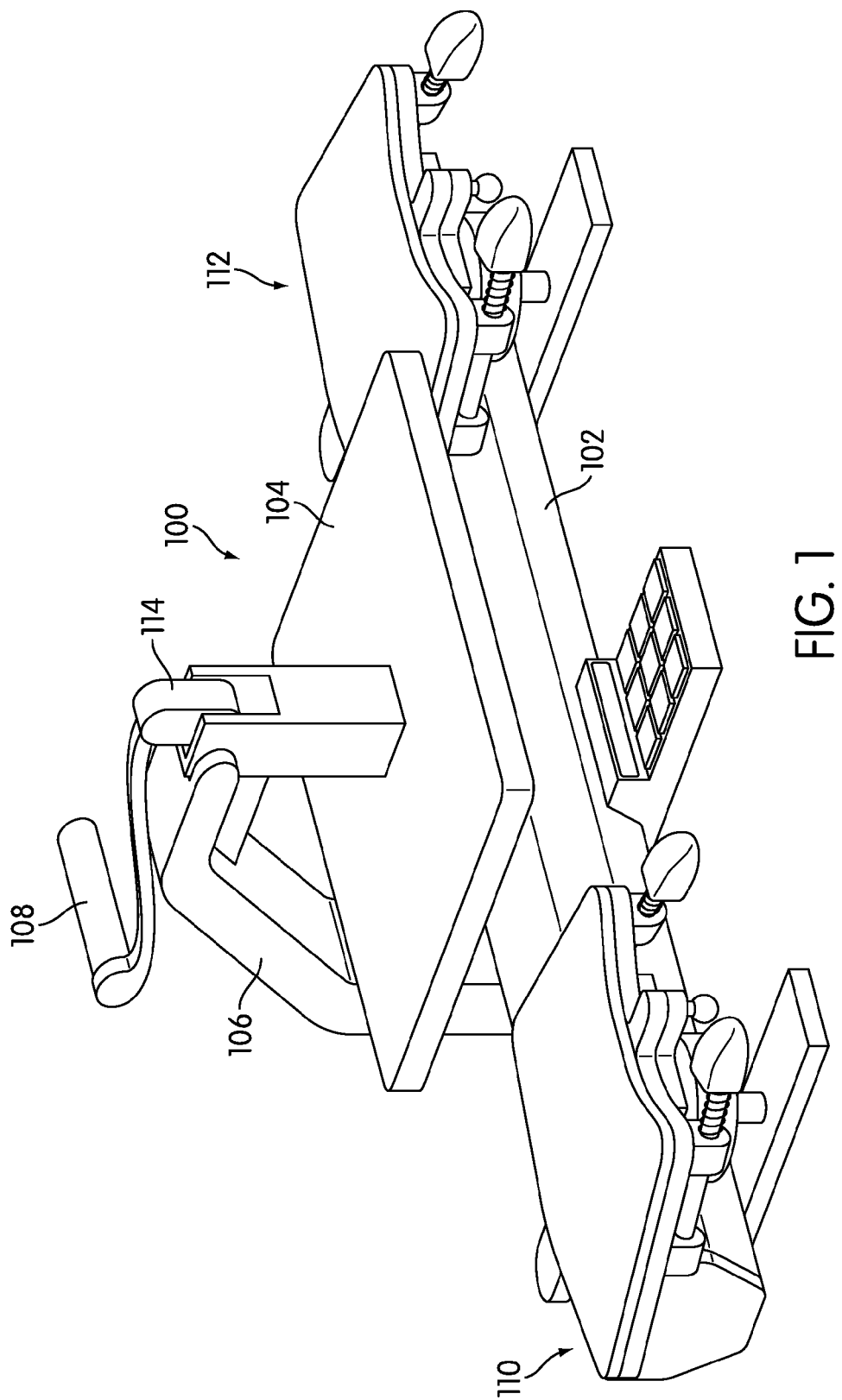
FIG. 1 is an exemplary embodiment of two platens disposed on a heat press machine.

FIG. 1 shows an exemplary embodiment of two heat press platens disposed on a heat press machine 100. Heat press machine 100 comprises a base 102 and a top heat plate 104 connected to base 102 by an arm 106 having a handle 108. A first platen 110 may be connected to base at one end and a second platen 112 may be connected to base 102 at the opposite end. As discussed in detail below, first and second platens 110, 112 may have the same components and may be interchangeable. Arm 106 may be connected to base 102 so that it slides top heat plate 104 from a first position overlying first platen 110 to a second position overlying second platen 112. Top heat plate 104 may be vertically displaced by pulling handle 108 forward about a pivot point 114. The operation of using heat press machine 100 and platens to print on shoes will be discussed with reference to FIGS. 7-10 below. Heat press machine 100 is merely exemplary. First and second platens 110, 112 may be used with any other similar type of heat press machine. For example, first and second platens 110, 112 may be used interchangeably on a heat press machine that receives one platen at a time.

Figure 2:
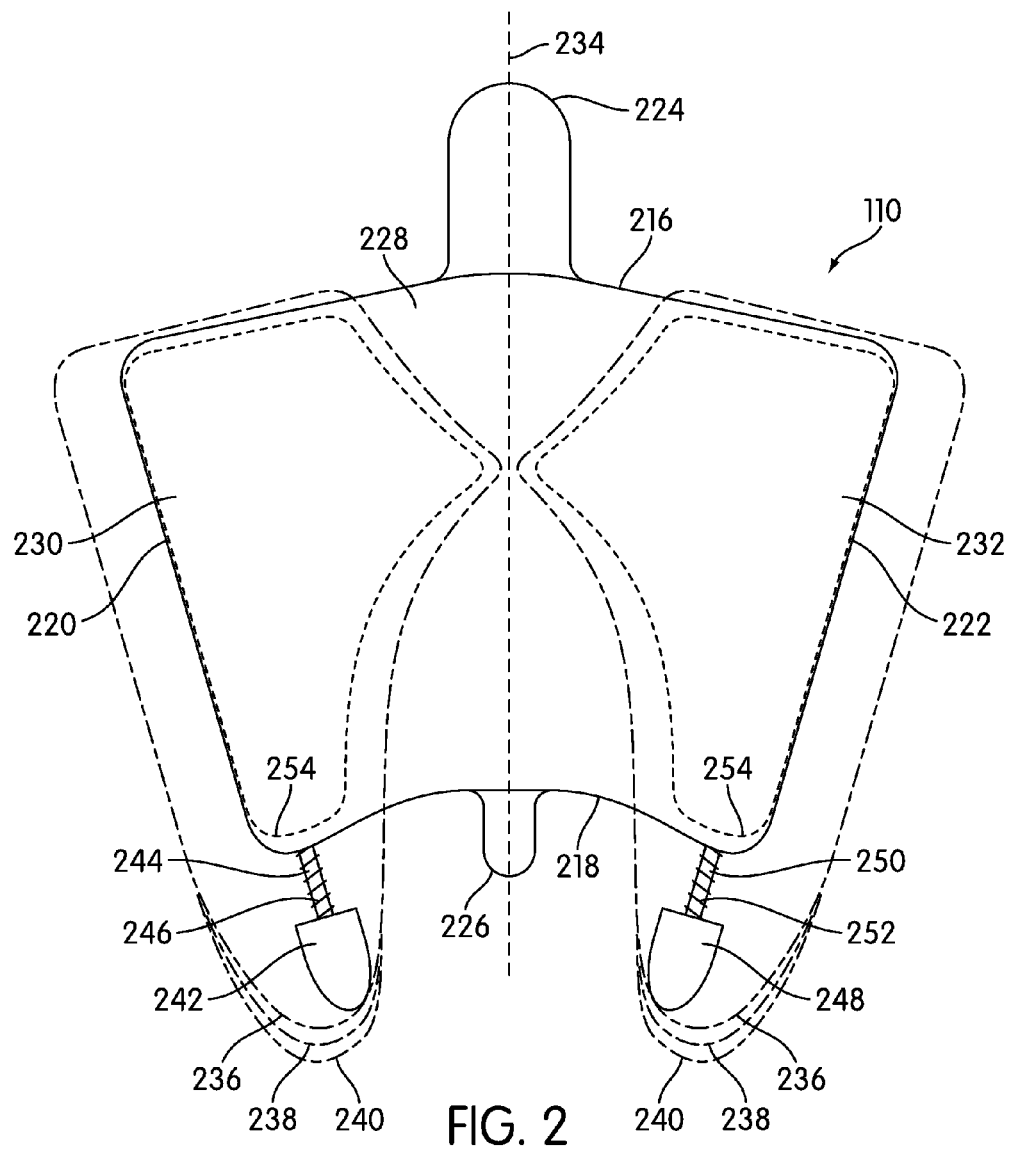
FIG. 2 is a top view of a platen from FIG. 1.
Figure 3:
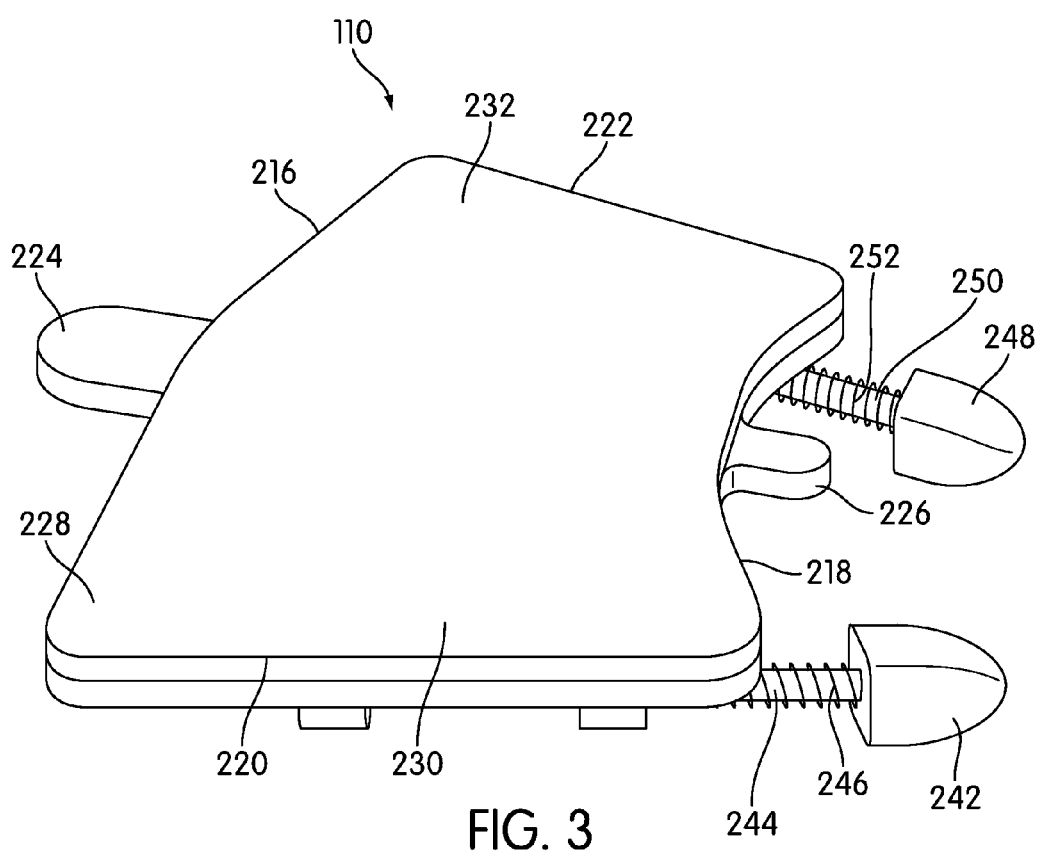
FIG. 3 is an perspective view of the top of the platen from FIG. 2.

FIG. 2 is a top view of platen 110 and FIG. 3 is a perspective view of the top of platen 110. Platen may be formed with a first edge 216, a second edge 218 opposite first edge 216, a third edge 220, and a fourth edge 222 opposite third edge 220. First edge 216 and second edge 218 may be curved in the same direction. Third edge 220 and fourth edge 222 may be straight. The width of platen 110 defined by third edge 220 and fourth edge 222 may be tapered from first edge 216 to second edge 218. A first protrusion 224 may extend from first edge 216 and a second protrusion 226 may extend from second edge 218. As described in detail with reference to FIGS. 4 and 5 below, first protrusion 224 and second protrusion 226 may provide slots for connecting platen 110 to heat press machine 100.

Platen 110 may be made of metal or any other material suitable for heat pressing. A pad 228 may be shaped to cover a flat press surface of platen 110 to provide padding beneath the shoe material being printed on. Pad 228 may be made of silicone or any other material capable of providing padding while withstanding high heat and pressure. Pad may include adhesive backing or adhesive may be applied to pad 228 or platen 110 for attachment. In some embodiments, pad 228 may be omitted.

Platen 110 may include a first shoe receiving portion 230 and a second shoe receiving portion 232. Platen 110 may be symmetrical about longitudinal axis 234 such that first shoe receiving portion 230 and second shoe receiving portion 232 may be mirror images of one another. Thus, when a pair of shoes is loaded on platen 110, the shoes may be mirror images of one another. This positioning allows a single print, including mirror images of the same design, to be applied to two shoes at the same time. First shoe receiving portion 230 may be bounded by part of first edge 216, part of second edge 218, and third edge 220. Second shoe receiving portion may be bounded by part of first edge 216, part of second edge 218, and fourth edge 222.

FIG. 2 shows a first pair of shoe outlines 236, a second pair of shoe outlines 238, and a third pair of shoe outlines 240 to demonstrate how a pair of shoes may be arranged on first shoe receiving portion 230 and second shoe receiving portion 232. First pair of shoe outlines 236, second pair of shoe outlines 238, and third pair of shoe outlines 240 each represents a different shoe size demonstrating how a single platen may accommodate a range of shoe sizes. A first piston spring tensioner and a second piston spring tensioner may be provided to further aid in accommodating a range of shoe sizes. First piston spring tensioner may include a first piston head 242 and a first rod 244. First piston spring tensioner may further include a first coil spring 246 disposed around first rod 244. Second piston spring tensioner may include a second piston head 248 and a second rod 250. Second piston spring tensioner may further include a second coil spring 252 disposed around second rod 250. More details of first and second spring tensioners are discussed with reference to FIGS. 4 and 5 below.

As shown in FIG. 2, a pair of print surface outlines 254 reveal where the print may appear on the shoes loaded on platen 110, as well as where top heat plate 104 may contact first shoe receiving portion 230 and second shoe receiving portion 232. The shape of first shoe receiving portion 230 and second shoe receiving portion 232 allows a large portion of a pair of shoes to be flattened by top heat plate 104, and thus printed on. Platen 110 may be tapered along the longitudinal axis 243 to minimize the print paper size while centering the print surfaces of the shoes (indicated by print surface outlines 254) beneath top heat plate 104. The print size may be reduced because the tapering minimizes the space between the two shoes being printed on, as demonstrated by the position of first pair of shoe outlines 236, second pair of shoe outlines 238, and third pair of shoe outlines 240. Tapering may also position the print surfaces of the shoes (indicated by print surface outlines 254) so that the print surfaces may lie beneath the center of top heat plate 104 during heat pressing. Positioning the shoes beneath the center of top heat plate 104 may improve heat transfer and pressure during heat pressing. Additionally, this positioning may limit temperature loss experienced at the edges of top heat plate 104. As a result of tapering, the size of platen 110 may be minimized.

The shape of platen 110 may allow left and right shoes to be interchangeably received on platen 110 to print on both lateral and medial sides of a pair of shoes. For example, first shoe receiving portion 230 may receive a right shoe and second shoe receiving portion 232 may receive a left shoe, as indicated by first pair of shoe outlines 236, second pair of shoe outlines 238, and third pair of shoe outlines 240, to print on the lateral sides of a pair of shoes. Then, the left shoe may be moved to the first shoe receiving portion 230 and the right shoe may be moved to the second shoe receiving portion 232 to print on the medial sides of the pair of shoes.

Figure 4:
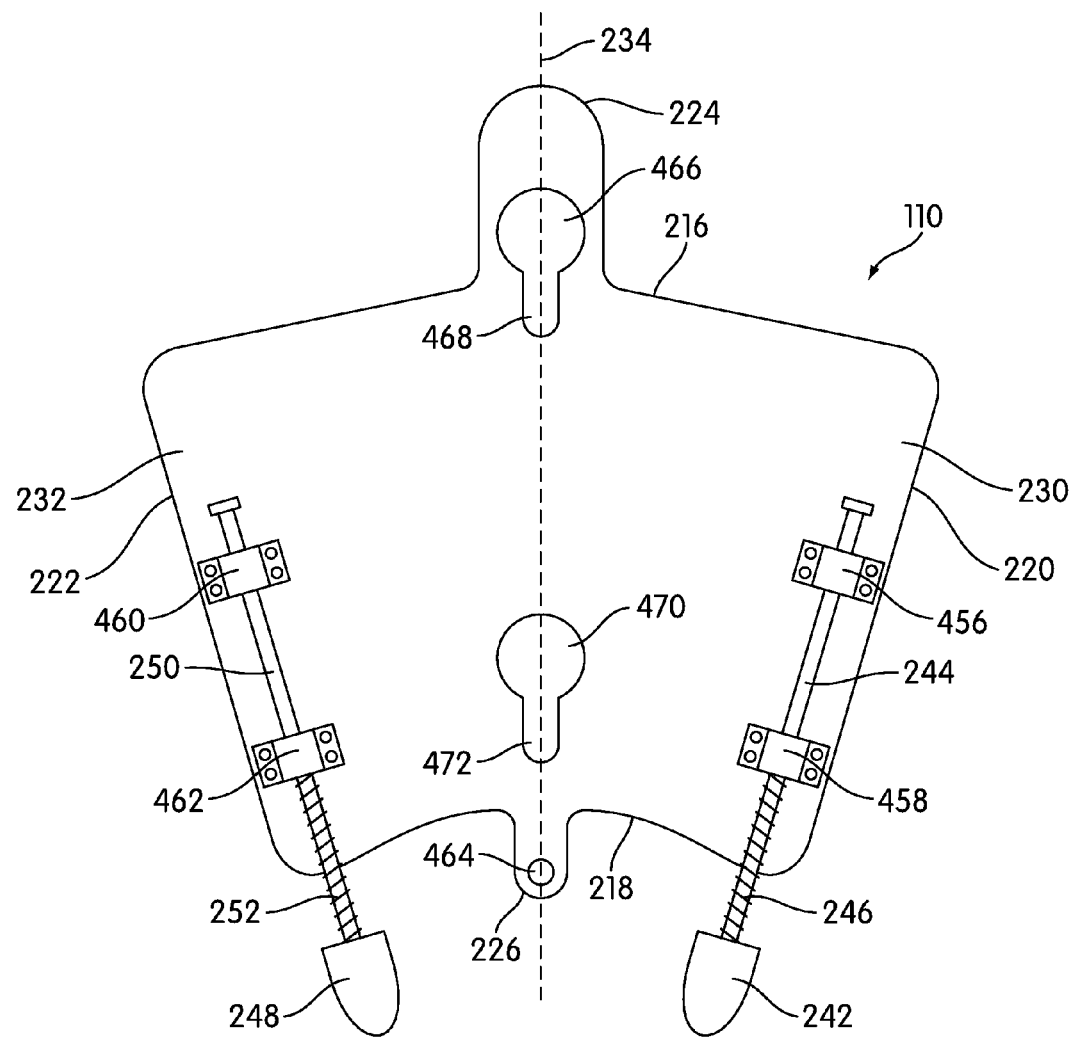
FIG. 4 is a bottom view of the platen from FIG. 2.
Figure 5:
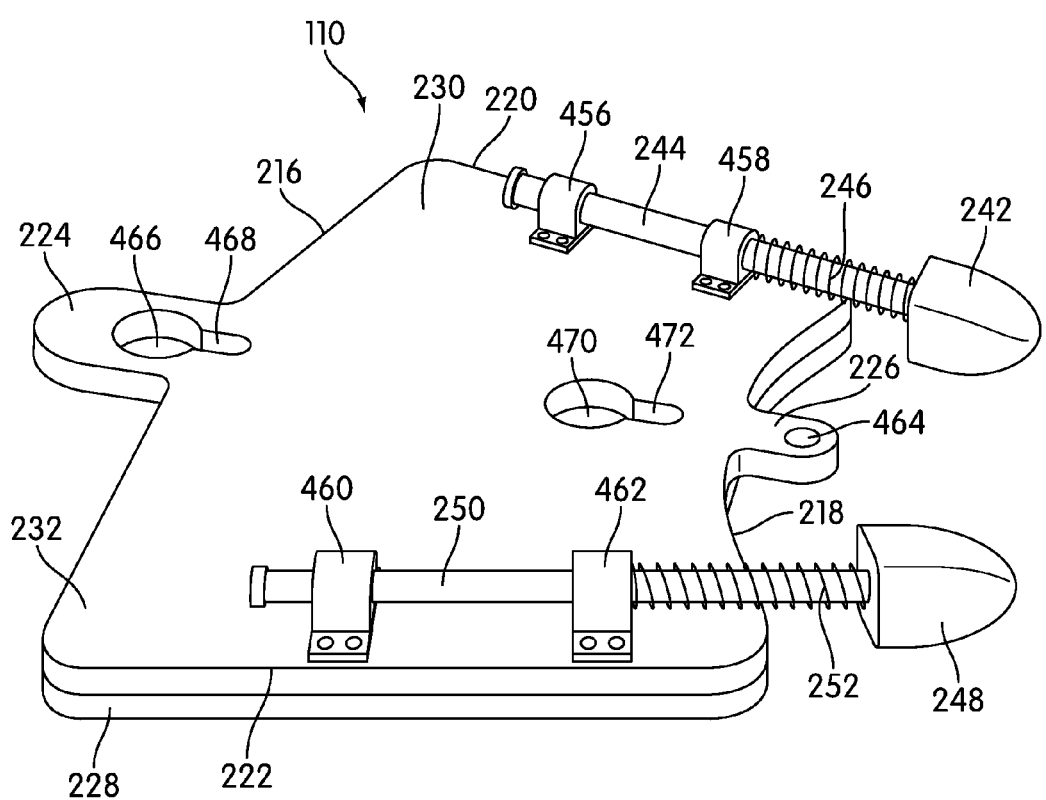
FIG. 5 is a perspective view of the bottom of the platen from FIG. 2.

FIG. 4 is a bottom view of platen 110 and FIG. 5 is a perspective view of the bottom of platen 110. As mentioned above, platen 110 includes first and second piston spring tensioners. First rod 244 of first piston spring tensioner may be connected to platen 110 by a first bracket 456 and a second bracket 458. First coil spring 246 may be disposed around first rod 244 between second bracket 458 and first piston head 242. Second rod 250 may be connected to platen 110 by a third bracket 460 and a fourth bracket 462. Second coil spring 252 may be disposed around second rod 250 between fourth bracket 462 and second piston head 248. As shown by the placement of first pair of shoe outlines 236, second pair of shoe outlines 238, and third pair of shoe outlines 240 in FIG. 2, first piston head 242 and second piston head 248 may rest against a toe of shoes. First coil springs 246 may bias first piston head 242 and second coil spring 252 may bias second piston heads 248 against the toe of shoes to create longitudinal tension in the shoes. This tension may enhance the flattening of shoes against platen 110 to facilitate even printing on the shoes. The spring-biasing of first and second piston spring tensioners may also improve the adjustability of platen by aiding the platen in receiving a range of shoe sizes. In some embodiments, first coil spring 246 and second coil spring 252 may be replaced by other mechanisms for biasing first piston head 242 and second piston head 248 against the toes of shoes. In some embodiments, piston spring tensioners may be omitted.

The bottom of platen 110 may include quick connect mechanisms for quickly connecting platen to base. For example, as shown in FIGS. 4 and 5, the quick connect mechanisms may include a first T-slot, a second T-slot, and a shallow hole 464 disposed along longitudinal axis 234. In some embodiments, the quick connect mechanisms may include a single T-slot and a shallow hole. In some embodiments, the quick connect mechanisms may include a plurality of shallow holes. In some embodiments, the quick connect mechanisms may include different types of mechanisms configured to connect with various types of heat press machines.

The first T-slot may be formed by a first circular hole 466 and a first slot 468. The second T-slot may be formed by a second circular hole 470 and a second slot 472. Shallow hole 464 may be shallower than first and/or second T-slots. In some embodiments, shallow hole 464 may be at the same depth as the first and/or second T-slots. In some embodiments, shallow hole 464 may include a hole having a depth that is deeper than the first and/or second T-Slots.

Figure 6:
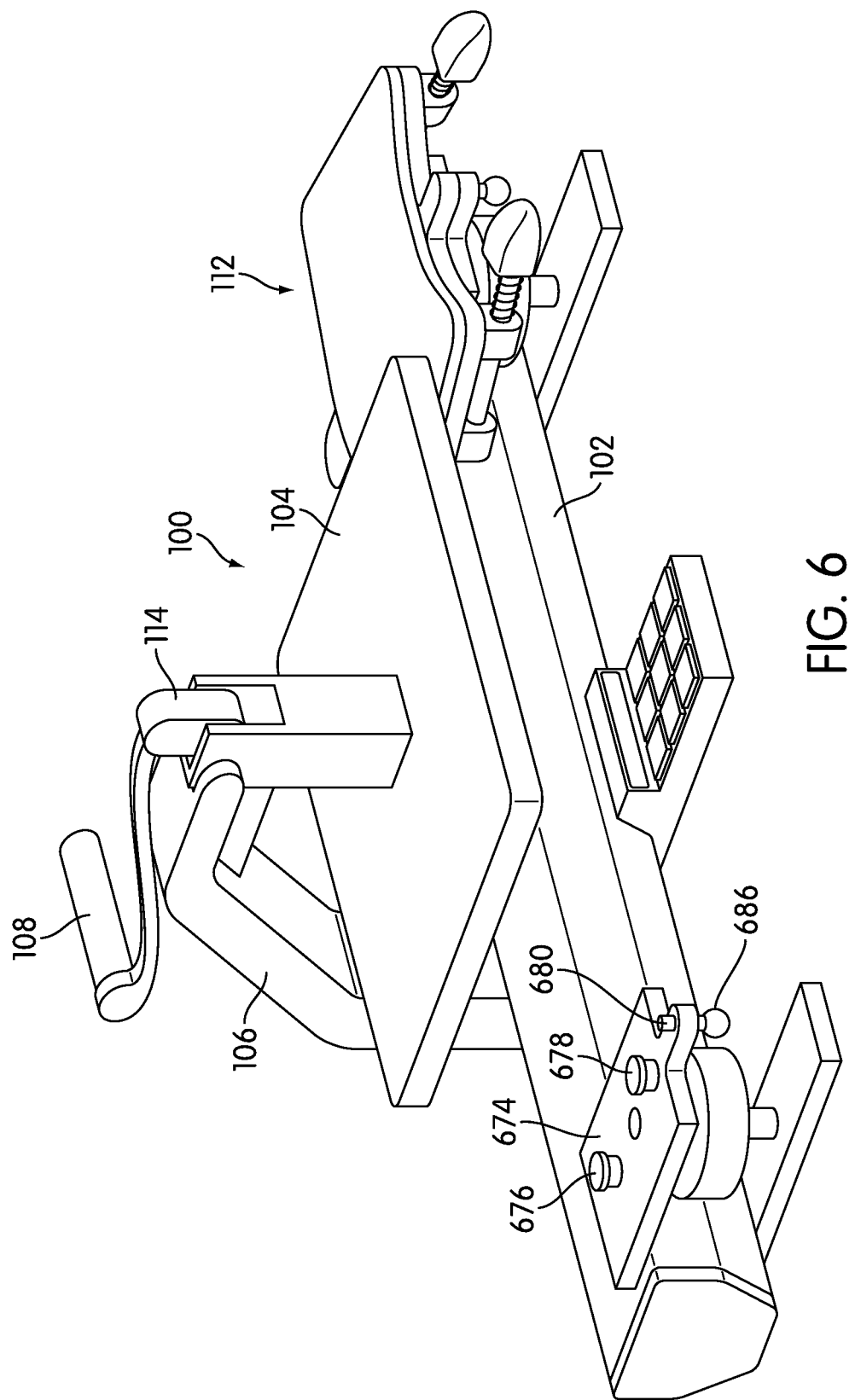
FIG. 6 is the press machine from FIG. 1 with a platen removed to expose a quick connect plate.

FIG. 6 shows press machine 100 from FIG. 1 with platen 110 removed to expose a quick connect plate 674. Quick connect plate 674 may include quick connect mechanisms complimentary to the quick connect mechanisms of platen 110. The quick connect plate 674 may include a first circular head 676, a second circular head 678, and a retractable button 680. First circular head 676 and second circular heads 678 may be connected to quick connect plate 674 by a first neck 682 and a second neck 684, respectively.

To connect platen 110 to quick connect plate 674 as shown in FIG. 1, platen 110 may be placed on top of quick connect plate 674 so that first circular hole 468 and second circular hole 470 line up with first circular head 676 and second circular head 678, respectively. When first circular head 676 and second circular head 678 are inserted into first circular hole 468 and second circular hole 470, platen 110 may be pushed along longitudinal axis 234 so that first neck 682 slides within first slot 468 and second neck 684 slides within second slot 472 until retractable button 680 may be inserted into shallow hole 464. In this position, first slot 468 and second slot 472 and retractable button 680 may prevent platen from moving in a direction transverse to longitudinal axis 234. Retractable button 680 may further prevent platen 110 from moving along longitudinal axis 234.

Quick connect plate 674 may further include a knob 686 for releasing retractable button 686 from shallow hole 464. To disconnect platen 110, knob 686 may be pulled down to withdraw retractable button 686 from within shallow hole 464 as platen 110 may be pushed along longitudinal axis 234 until first circular hole 468 and second circular hole 470 line up with first circular head 676 and second circular head 678, respectively. Then, platen 110 may be lifted and removed from press machine 100.

The quick connect mechanisms on platen 110 may allow platen 110 to be quickly interchanged with another platen. Thus, platen 110 may be replaced with a platen of a different size and/or platen 110 may be replaced with a preloaded platen. For example, while a first pair of shoes loaded on platen 110 may be being printed on, a second platen may be loaded with second pair of shoes. Then, when printing on the first pair of shoes is complete, platen 110 may be quickly replaced with the second platen. And as the second pair of shoes is being printed on the second platen, platen 110 may be loaded with a third pair of shoes.

The quick connect mechanisms shown in FIGS. 4-6 are merely exemplary embodiments. In some embodiments, the size, shape, and location of the quick connect mechanisms may be altered. In other embodiments, different types of quick connect mechanisms may be provided for connection between platen 110 and quick connect plate 674. For example, platen 110 may be used with another type of press machine. In this situation, the quick connect mechanisms provided on platen 110 may be altered to correspond with the quick connect mechanism provided on the press machine that platen 110 is being used with.

Figure 7:
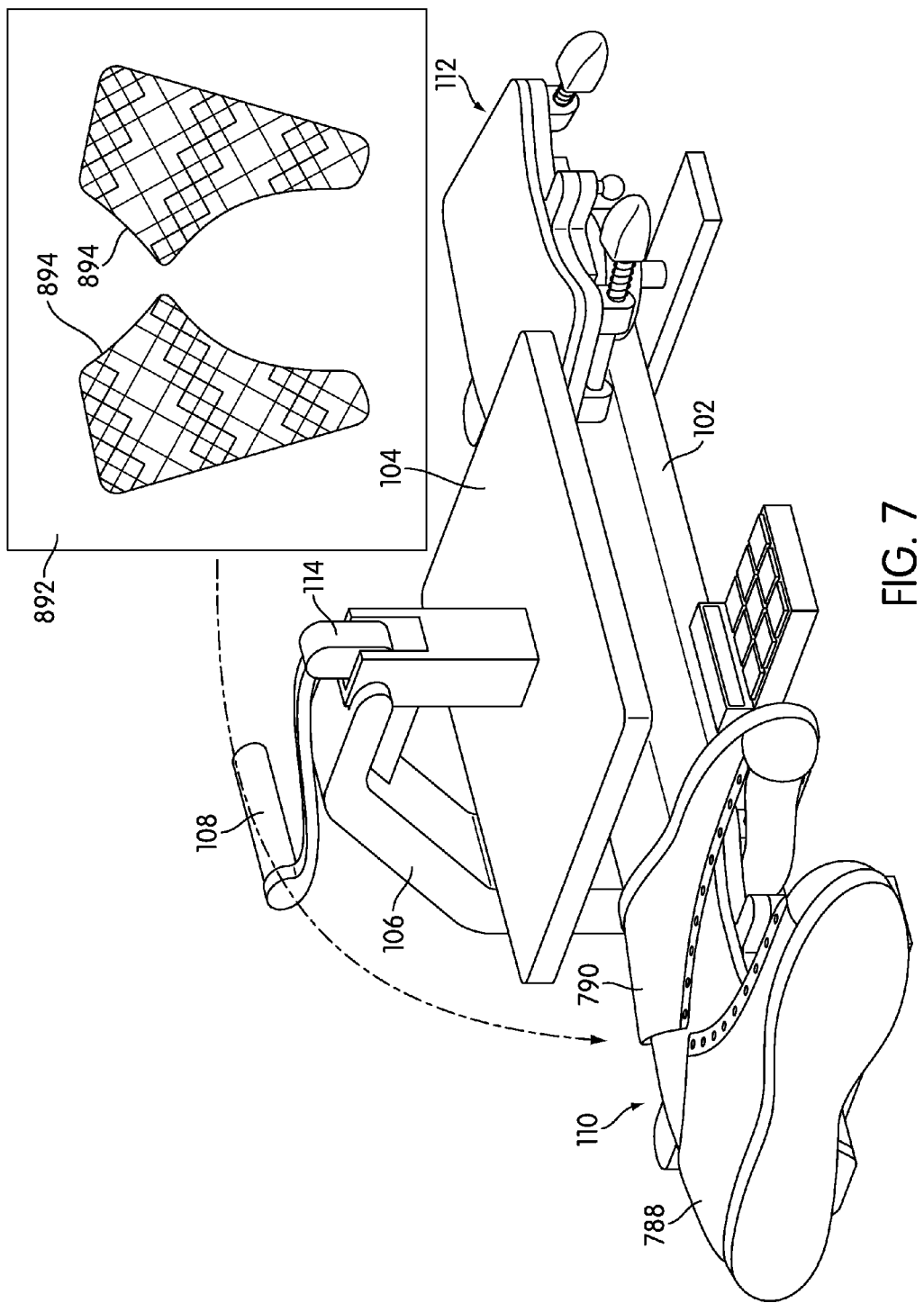
FIG. 7 is the press machine from FIG. 1 with shoes loaded on a platen and a design to be printed on the shoes.
Figure 8:
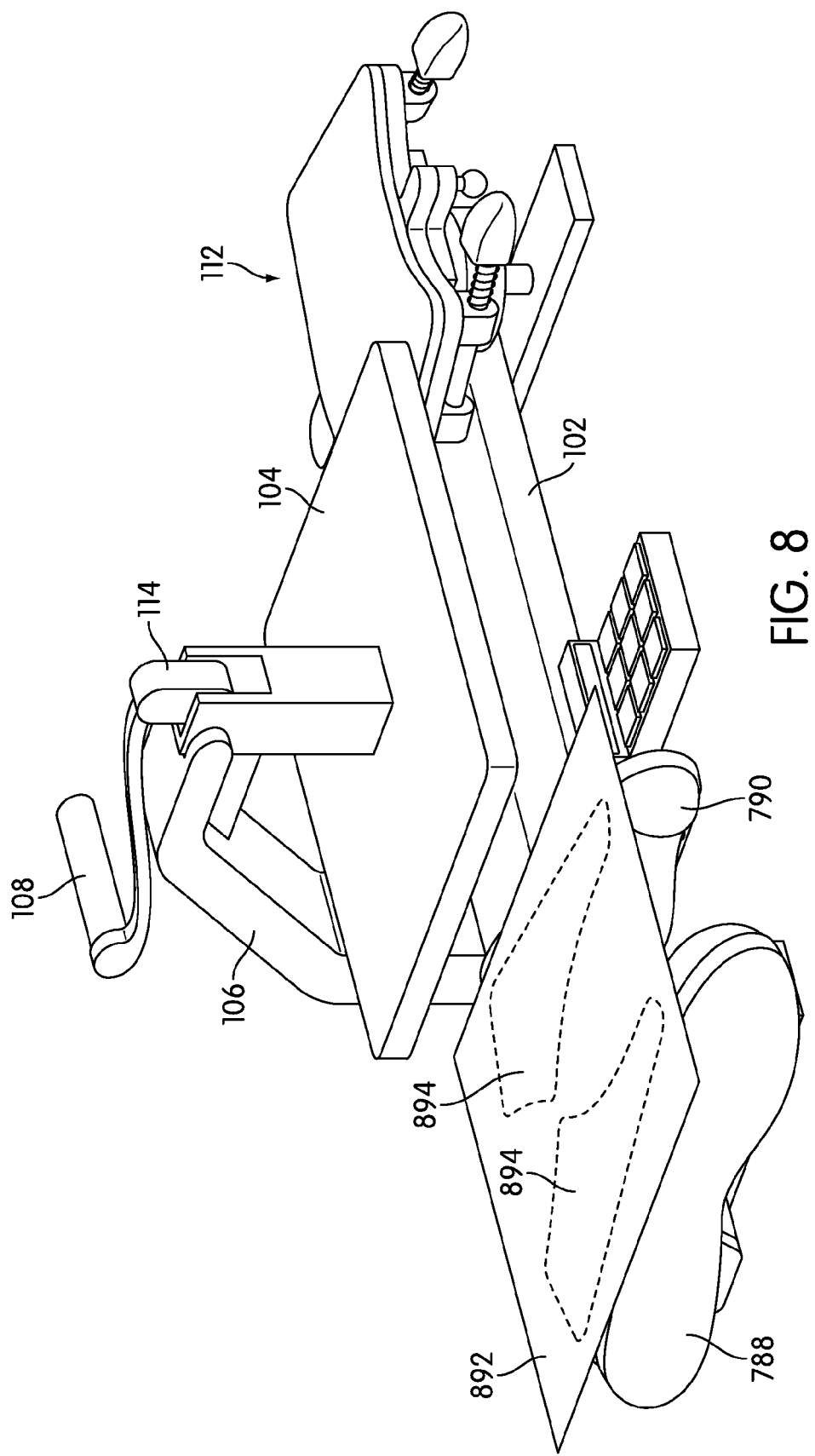
FIG. 8 is the press machine from FIG. 7 with the design overlying the shoes.
Figure 9:
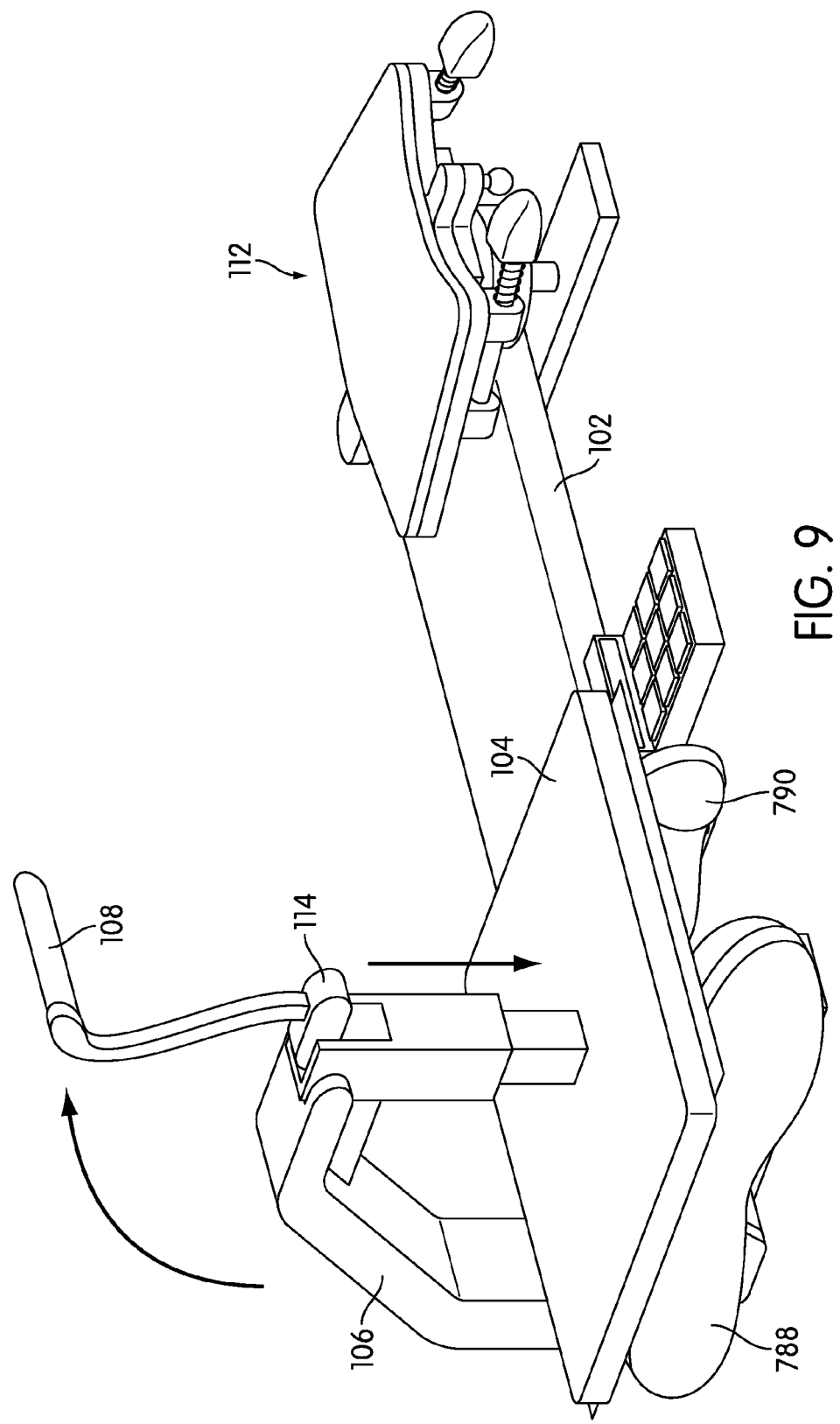
FIG. 9 is the press machine from FIG. 7 with the heat press plate pressing down on the shoes.

FIGS. 7-9 demonstrate a method of using press machine 100 and platen 110 to print on a pair of shoes. FIG. 7 is an isometric view of a right shoe 788 mounted on first shoe receiving portion 230 and a left shoe 790 mounted on second shoe receiving portion 232. As discussed above with reference to FIGS. 2, 4, and 5, first piston head 242 and second piston head 248 may press against the toes of right shoe 788 and left shoe 790 to create longitudinal tension in right shoe 788 and left shoe 790. The tension may enhance the flattening of the lateral sides of right shoe 788 and left shoe 790 against the flat press surface of platen 110. The shoes may be mounted on platen 110 before platen 110 is mounted on quick connect plate 674, as discussed above with reference to FIGS. 4-6. Alternatively, platen 110 may be connected to press machine 100 before loading right shoe 788 and left shoe 790 onto platen 110.

FIG. 7 further shows a piece of transfer paper 892 with an argyle design 894 to be printed on right shoe 788 and left shoe 790. Argyle design 894 may be printed in dye sublimation ink on a piece of sublimation transfer paper. In some embodiments, any other known type of ink and/or transfer paper may be used. Argyle design 894 may be replaced with any design.

FIG. 8 shows transfer paper 892 placed over right shoe 788 and left shoe 790. Argyle design 894 may be positioned over right shoe 788 and left shoe 790 where argyle design 894 is to be printed. Then, top heat plate 104 may be slid from first end of base 102 to second end of base 102 so that it may be positioned over argyle design 894 and platen 110. As shown in FIG. 9, while top heat plate 104 is positioned over argyle design 894 and platen 110, handle 108 may be pulled forward so that top heat plate 104 may be lowered onto argyle design 894. Top heat plate 104 may be heated and may press argyle design 894 down against right shoe 788 and left shoe 790, thus printing argyle design 894 onto right shoe 788 and left shoe 790.

Figure 10:
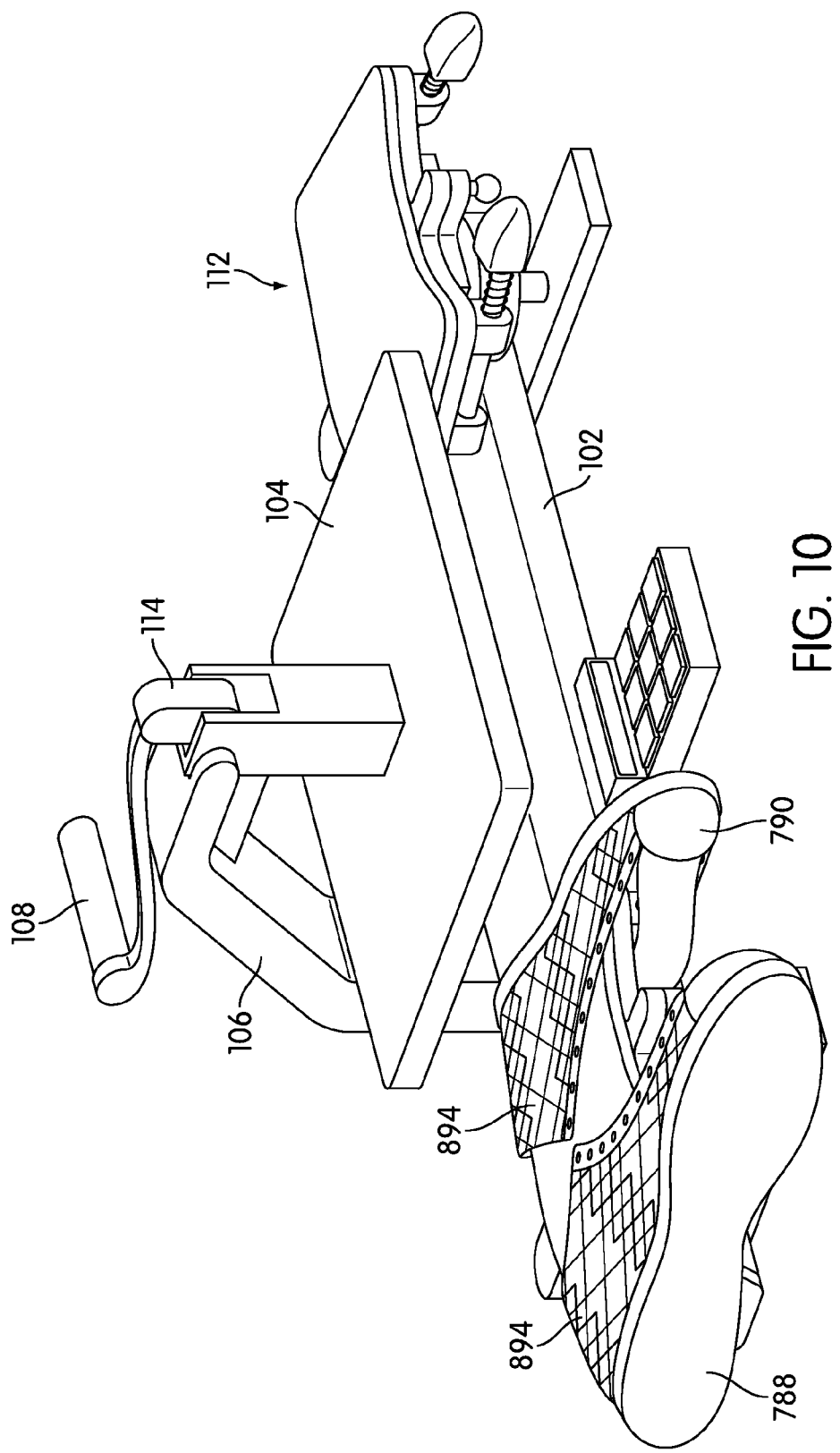

FIG. 10 shows right shoe 788 and left shoe 790 after argyle design 894 is printed on lateral sides of right shoe 788 and left shoe 790. To print on the medial sides of right shoe 788 and left shoe 790, right shoe 788 may be moved to second shoe receiving portion 232 and left shoe 790 may be moved to first shoe receiving portion 230. Then, the above-described method of using press machine 100 and platen 110 to print on a pair of shoes may be performed.

Figure 11:
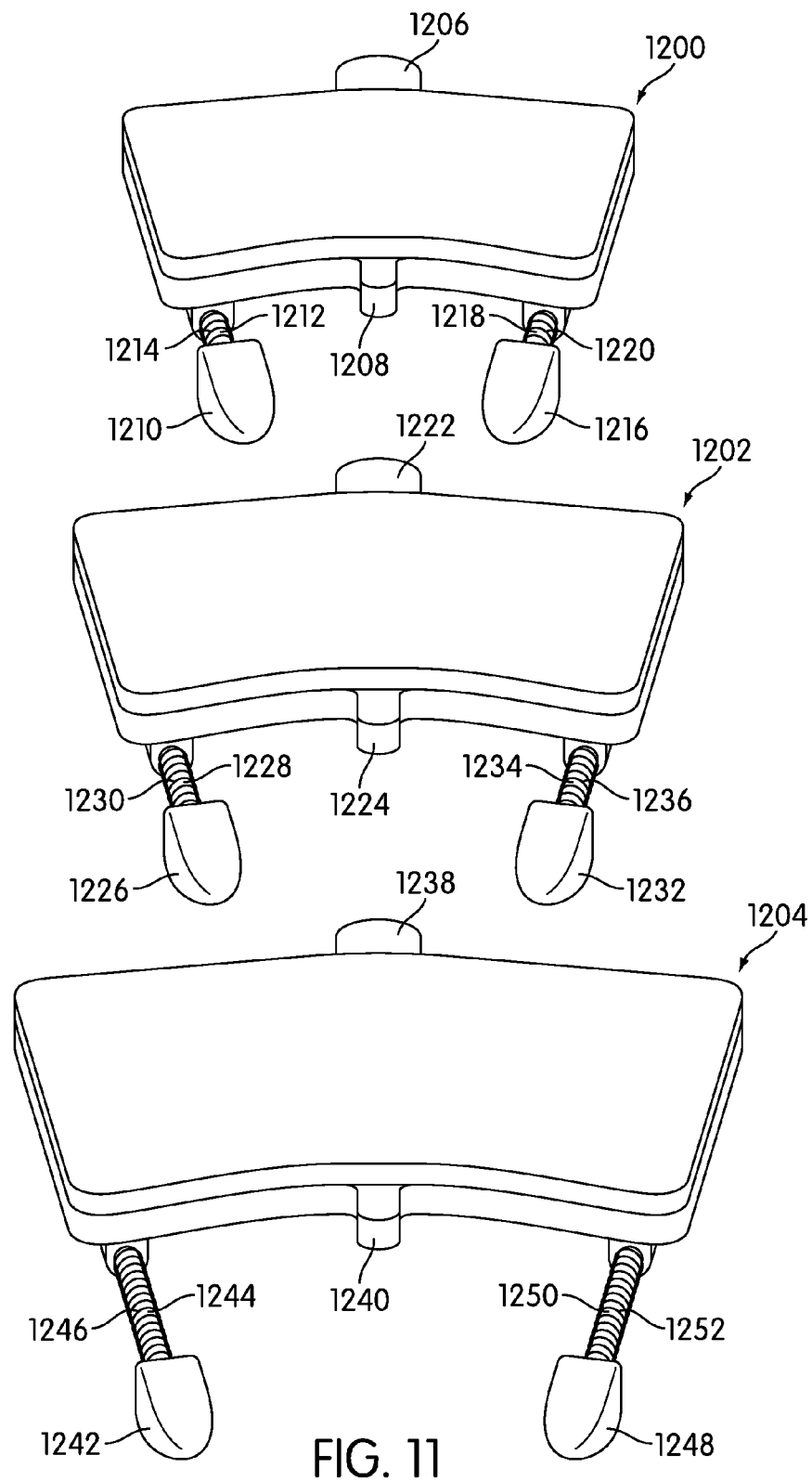
FIG. 11 is an exemplary embodiment of multiple platens having different sizes.

FIG. 11 shows exemplary embodiments of platens in different sizes such that each platen may accommodate a range of shoe sizes. A small platen 1200 may accommodate sizes 4 through 6, a medium platen 1202 may accommodate sizes 7 through 9, and a large platen 1204 may accommodate sizes 10 through 13. While a single platen may accommodate a wide range of shoe sizes, a more precise fit can be achieved by providing multiple platens each sized to accommodate a small range of shoe sizes. In some embodiments, a single platen may be used to accommodate all shoes sizes. In other embodiments, more sizes of platens may be used to provide a more precise fit for each shoe size. For example, each individual platen may be sized to accommodate a single shoe size. In another example, the platens may be sized as shown in the exemplary embodiment of FIG. 11 and a fourth platen may be provided to accommodate sizes 14-16.

Small platen 1200, medium platen 1202, and large platen 1204 may have the same components as platen 110 shown in FIGS. 1-5 and 6-11. As shown in FIG. 11, small platen 1200 may have a first protrusion 1206, a second protrusion 1208, a first piston spring tensioner, and a second piston spring tensioner. The first piston spring tensioner may include a first piston head 1210 and a first rod 1212. The first piston spring tensioner may further include a first coil spring 1214 disposed around first rod 1212. The second piston spring tensioner may include a second piston head 1216 and a second rod 1218. The second piston spring tensioner may further include a second coil spring 1220 disposed around second rod 1218.

Medium platen 1202 may have a first protrusion 1222, a second protrusion 1224, a first piston spring tensioner, and a second piston spring tensioner. The first piston spring tensioner may include a first piston head 1226 and a first rod 1228. The first piston spring tensioner may further include a first coil spring 1230 disposed around first rod 1228. The second piston spring tensioner may include a second piston head 1232 and a second rod 1234. The second piston spring tensioner may further include a second coil spring 1236 disposed around second rod 1234.

Large platen 1204 may have a first protrusion 1238, a second protrusion 1240, a first piston spring tensioner, and a second piston spring tensioner. The first piston spring tensioner may include a first piston head 1242 and a first rod 1244. The first piston spring tensioner may further include a first coil spring 1246 disposed around first rod 1244. The second piston spring tensioner may include a second piston head 1248 and a second rod 1250. The second piston spring tensioner may further include a second coil spring 1252 disposed around second rod 1250.

As shown in FIG. 11, in addition to small platen 1200, medium platen 1202, and large platen 1204 differing in size, the components of small platen 1200, medium platen 1202, and large platen 1204 may also differ in size. The sizes of the components may differ to further aid in accommodating a range of shoe sizes. For example, as the platens increase in size to accommodate larger shoe sizes, the piston heads may also increase in size. Small platen 1200 may include small piston heads, medium platen 1202 may include medium piston heads, and large piston 1204 may include large piston heads. Similarly, the length of rods may correspond with the size of the platens. For example, small platen 1200 may have a short rod, medium platen 1202 may have a medium rod, and large platen 1204 may have a long rod.

The first and second protrusions of small platen 1200, medium platen 1202, and large platen 1204 may be sized to position the shallow hole and the first circular hole in a location corresponding with the first circular head and the retractable button of the quick connect plate, as discussed with reference to FIGS. 4-6 above. In some embodiments, the size and shape of the protrusions may vary depending on the type of quick connect mechanisms provided on the platen and the press machine. In some embodiments, the protrusions may be eliminated entirely and the quick connect mechanisms may be provided in another location of the platens.

Figure 12:
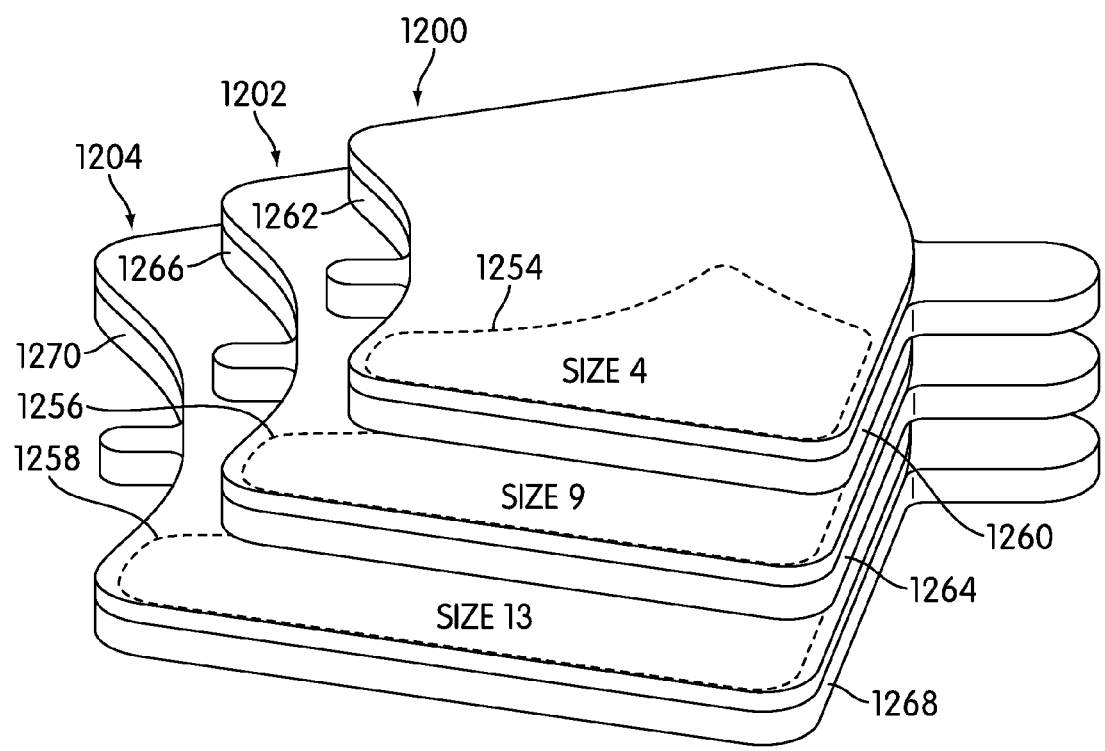
FIG. 12 is a view of the platens from FIG. 11 stacked.

FIG. 12 shows small platen 1200, medium platen 1202, and large platen 1204 stacked. The piston spring tensioners of small platen 1200, medium platen 1202, and large platen 1204 have been removed in this view. Small platen 1200 is shown with a first print surface outline 1254 for a size 4 shoe. Medium platen 1202 is shown with a second print surface outline 1256 for a size 9 shoe. Large platen 1204 is shown with a third print surface outline 1258 for a size 13 shoe. Similar to platen 110 shown in FIGS. 1-5, small platen 1200 may have a first edge 1260 and a second edge 1262, medium platen 1202 may have a first edge 1264 and a second edge 1266, and large platen 1204 may have a first edge 1268 and a second edge 1270. In FIG. 12, small platen 1200, medium platen 1202, and large platen 1204 are stacked with first edges aligned to show how the different sizes of platens and shoe prints compare. While the sizes of small platen 1200, medium platen 1202, and large platen 1204 differ, the general shape of the platens may remain the same.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A method of customizing a shoe, comprising:
    loading a first shoe onto a first shoe receiving portion of a first heat press device;
    loading a second shoe onto a second shoe receiving portion of the first heat press device;
    connecting the first heat press device to a heat press machine;
    placing a first design on top of the first shoe and a second design on top of the second shoe; and
    pressing a heat plate of the heat press machine against the first shoe and the second shoe.

2. The method according to claim 1, further comprising replacing the first heat press device with a second heat press device.

3. The method according to claim 1, wherein connecting the first heat press device to the heat press machine includes placing the first heat press device over the heat press machine and sliding the first heat press device until the first heat press device connects with the heat press machine.

4. The method according to claim 1, wherein the step of loading a first shoe onto the first shoe receiving portion includes loading the first shoe onto a first piston spring tensioner.

5. The method according to claim 4, wherein the first piston spring tensioner includes a first piston head and a first rod extending from the first piston head, the first rod being biased by a first spring.

6. The method according to claim 5, wherein the step of loading the second shoe onto the second shoe receiving portion includes loading the second shoe onto a second piston spring tensioner having a second piston head and a second rod extending from the second piston head, the second rod being biased by a second spring.

7. The method according to claim 1, wherein the second shoe receiving portion is opposite the first shoe receiving portion.

8. A method of customizing a shoe, comprising:
    loading a first shoe onto a first shoe receiving portion of a first heat press device, wherein the step of loading the first shoe onto the first shoe receiving portion includes inserting a first piston spring tensioner of the first heat press device inside a toe portion of the first shoe and wherein the first piston spring tensioner has having a first piston head and a first rod extending from the first piston head;

connecting the first heat press device to a heat press machine;

placing a design on top of the first shoe; and pressing a heat plate of the heat press machine against the first shoe.

9. The method according to claim 8, wherein the first heat press device includes a flat press surface having a first edge, a second edge opposite the first edge, a third edge connecting the first edge to the second edge, and a fourth edge opposite the third edge, wherein the distance between the third edge and the fourth edge tapers continuously from the first edge to the second edge and wherein part of the first edge, part of the second edge, and the third edge together define the first shoe receiving portion.

10. The method according to claim 9, wherein the first rod and the first piston head extend from the second edge.

11. The method according to claim 8, wherein the first piston spring tensioner includes a first spring biasing the first piston head against the toe portion of the first shoe when the first shoe is loaded onto the first shoe receiving portion.

12. The method according to claim 8, wherein connecting the first heat press device to the heat press machine includes inserting a retractable button disposed quick connect plate of the heat press machine into a first hole disposed on the first heat press device.

13. The method according to claim 12, further comprising replacing the first heat press device with a second heat press device by retracting the retractable button, sliding the first heat press device to remove the first heat press device, and connecting a second heat press device to the heat press machine.

14. The method according to claim 8, further comprising heating a heat plate.

15. A method of customizing a shoe, comprising:

loading a first shoe onto a first shoe receiving portion of a first heat press device, wherein the first heat press device includes a first quick connect mechanism;

connecting the first heat press device to a heat press machine by a second quick connect mechanism that corresponds with the first quick connect mechanism;

placing a design on top of the first shoe; and pressing a heat plate of the heat press machine against the first shoe.

16. The method according to claim 15, wherein the second quick connect mechanism is disposed on a quick connect plate of the heat press machine and connecting the first heat press device to the heat press machine includes inserting the second quick connect mechanism into the first quick connect mechanism disposed on the first heat press device.

17. The method according to claim 16, wherein the second quick connect mechanism is a protrusion and the first quick connect mechanism is a T-slot having a hole with a shape that corresponds with a shape of the protrusion.

18. The method according to claim 15, wherein connecting the first heat press device to the heat press machine includes inserting the second quick connect mechanism disposed on a quick connect plate of the heat press machine into the first quick connect mechanism disposed on the first heat press device and inserting a third quick connect mechanism disposed on the quick connect plate of the heat press machine into a fourth quick connect mechanism disposed on the first heat press device, wherein the first quick connect mechanism and the fourth quick connect mechanism are aligned.

19. The method according to claim 15, wherein the heat press device includes a flat press surface having a first edge, a second edge opposite the first edge, a third edge connecting the first edge to the second edge, and a fourth edge opposite the third edge, wherein the distance between the third edge and the fourth edge tapers continuously from the first edge to the second edge and wherein part of the first edge, part of the second edge, and the third edge together define the first shoe receiving portion.

20. The method according to claim 15, further comprising loading a second shoe onto a second shoe receiving portion of the first heat press device that is opposite the first shoe receiving surface.

* * * * *